Sept. 15, 1931.   E. H. FREY   1,823,733
APPARATUS FOR PROTECTION OF POLYPHASE ELECTRICAL SYSTEMS
Filed Sept. 2, 1926
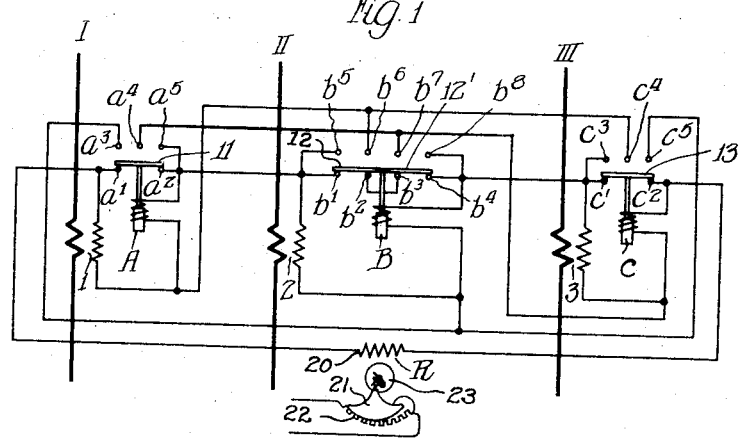
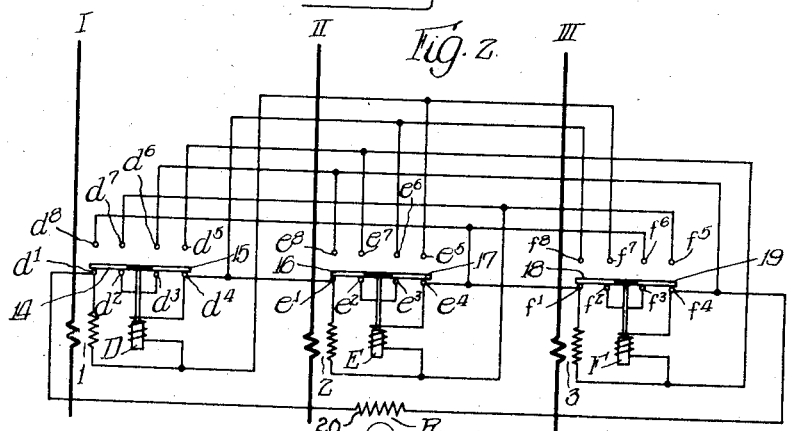
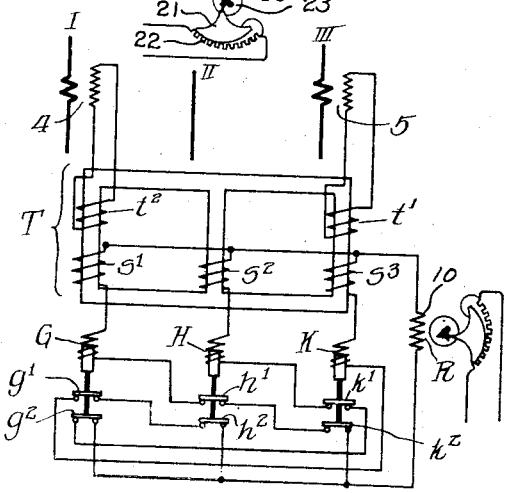
Witness:
R. Burkhardt
Inventor:
Ernst Hermann Frey Patented Sept. 15, 1931

1,823,733

UNITED STATES PATENT OFFICE

ERNST HERMANN FREY, OF INNERTKIRCHEN, SWITZERLAND, ASSIGNOR TO AKTIEN-GESELLSCHAFT BROWN BOVERI & CIE., OF BADEN, SWITZERLAND, A JOINT-STOCK COMPANY

APPARATUS FOR PROTECTION OF POLYPHASE ELECTRICAL SYSTEMS

Application filed September 2, 1926, Serial No. 133,276, and in Germany September 7, 1925.

This invention relates to a method and apparatus for protection of polyphase systems, and it has to do particularly with apparatus in which current limiting regulators are employed.

The general object of the invention is the provision of a method and apparatus for protection of polyphase systems which will operate with certainty and reliability.

Another object is the provision of protective apparatus so arranged with reference to polyphase systems that it will not be subjected to injury or functional disablement in the event of the occurrence of short circuits or other faults in a plurality of the phases of the system.

Other and further objects will be pointed out or indicated hereinafter, or apparent to one skilled in the art upon an understanding of the invention.

In the accompanying drawings forming a part of this specification I illustrate diagrammatically various arrangements of apparatus whereby the invention may be embodied and practiced, but these are presented for the purpose of illustration only and are not to be accorded any interpretation having the effect of limiting the invention claimed, short of its true and most comprehensive scope in the art.

In the drawings,

Fig. 1 is a diagram illustrating one arrangement of apparatus for use in conjunction with a three phase system, and Figs. 2 and 3 are diagrams illustrating two modified arrangements for three phase systems.

Electrical systems or installations are frequently protected against overload by the use of so-called current-limiting regulators. These instruments remain inactive as long as the loading is beneath a certain value but as soon as this limit is exceeded the load on the portion of the installation to be protected is regulated down to such a value that during the period of disturbance the allowable current limit is not exceeded. In polyphase systems short circuits may occur in any phase either singly or in combination with short circuits in other phases, and methods have therefore been devised for bringing the current-limiting regulator into action on the occurrence of an overload of whatever type.

For example, it is a well known plan to connect the current-limiting regulator to current transformers in several phases of a polyphase system instead of in one phase only. The most usual method is to connect the secondaries of current transformers in two phases in parallel, with crossed connections, to the winding of the protective apparatus. The advantage here is that only one protective apparatus is required and this will then operate for short circuits of all kinds. The disadvantage of the arrangement is that the operating current will be different according to the number and combination of the phases affected by the short circuit.

The underlying idea in the present invention is to cause the current transformers in the various phases to actuate maximum-current relays and to operate the protective apparatus through the medium of these as soon as the limit of loading for any one phase is exceeded.

The invention will be understood in more detail by reference to the drawings. In each figure the three phases of the main distribution line are designated by I, II, and III and the field winding means 20 of the current-limiting regulator or apparatus by R.

The regulator R is illustrated as being of the general type shown and described in Patent No. 1,003,600 of Sept. 19, 1911 to Guttinger, and includes the adjusting sector 21 supported for rolling movement over the contacts associated with the resistance element 22, the sector being actuated by the motor means comprising the motor field winding 20 and the cooperating disk or rotor element 23. The action is such that the position assumed by the adjusting sector 21 and its actuating rotor 23 varies directly with the degree or extent of excitation or energization of the motor field winding means 20. In Fig. 1 current transformers 1, 2 and 3 are placed in the respective three phases and their secondaries connected to the coils of the maximum-current relays A, B and C. In the arrangement illustrated in Fig. 1 the relays A and C associated with the two outer phases I and III, between which the winding R of the regulator is connected, have each five contacts, those of relay A being designated $a^1$, $a^2$—$a^5$, and those of relay C being designated $c^1$, $c^2$—$c^5$. The middle relay B has eight contacts, designated $b^1$, $b^2$—$b^8$. The moving contacts for the respective relays are designated 11, 12, 12′ and 13, contacts 12 and 12′ belonging to the middle relay being insulated from each other. When the line is carrying the normal current, the winding R of the regulator is short circuited by the movable contacts 11, 12, 12′ and 13 and therefore receives no current from any of the current transformers 1, 2 or 3.

Should the current in one phase alone exceed the allowable limit the short circuit would be removed from the regulator R and the maximum-current relays of the other phases cut out. For example, if the overload occurs in phase I the relay A would be operated from the current transformer 1. This would open contacts $a^1$ and $a^2$ and join contacts $a^3$, $a^4$ and $a^5$. The regulator R thus receives current which flows from one secondary pole of the current transformer 1 through the circuit R, $c^2$, 13, $c^1$, $b^4$, 12′, $b^3$, $b^2$, 12, $b^1$ and the coil of relay A to the other pole of the current transformer. At the same time the windings of the other two relays B and C are short circuited, the coil of B through contacts $a^3$, 11, $a^5$, $b^1$, 12, $b^2$, $b^3$, 12′, $b^4$, and the coil C through contacts $a^4$, 11, $a^5$, $b^1$, 12, $b^2$, $b^3$, 12′, $b^4$, $c^1$, 13, $c^2$.

A similar effect is produced by a short circuit in either phases II or III. If a short circuit occurs in two or three phases simultaneously, tending to operate the relays at the same instant, the effects in actual practice, however, will cause one to operate before the others, due to the ordinary non-uniformity in construction and the unequal magnetic and electrical resistances of the relays and current transformers, and to the fact that the short circuit currents in the various phases will not be equal in magnitude. As a consequence one of the relays will always operate and close its upper contacts first, thus short circuiting the others.

Fig. 2 shows another scheme of connections. Here the number of connections is somewhat increased, but the arrangement is clearer and more uniform as all the connections follow in cyclic order and the three relay are identical. Here each of the relays has eight contacts which are numbered successively and two moving contacts which act in unison. The moving contacts are designated by the characters 14, 15, 16, 17, 18 and 19.

When the line is carrying its normal load the coil R of the regulator is short circuited as before over the series of lower contacts and is thus out of action. In the event of an overload, say in phase II, the relay E operates and the regulator R is energized from the current transformer 2 through contacts $e^1$, $d^4$, 15, $d^3$, $d^2$, 14, $d^1$, R, $f^4$, 19, $f^3$, $f^2$, 18, $f^1$, $e^4$, and the coil of relay E. It is readily seen that the coil of relay F is short-circuited through contacts $e^8$, 16, $e^7$ and the coil of relay D through contacts $e^6$, 17, $e^5$.

For unearthed systems or in cases where it is considered feasible to do without the operation of the protective regulator in the event of a short circuit between phase II and the neutral point, the arrangement can be simplified as shown in Fig. 3. No current transformer is required in phase II, but in its place a three-core intermediate transformer T is employed. The primary windings $t^1$ and $t^2$ of this transformer are connected to the two transformers 4 and 5 in the outer phases I and III. The secondary windings $S^1$, $S^2$ and $S^3$ are connected in star and supply the three maximum-current relays G, H and K. This transformation to three phases is necessary when the protective apparatus is supplied from a transformer with composite connections. On the occurrence of a short circuit between two phases of the primary side it may then happen that the two phases I and II having current transformers $a$ and $c$ show only half the short-circuit current and the lines of force in the outer limbs of the transformer T form closed paths through the central limb in which the flux will be the sum of the lines in the two outer limbs. Hence the E. M. F. induced in winding $S^2$ will correspond to the full short circuit current and the relay coil H will be energized accordingly.

The connections are so arranged that under normal working conditions the protective regulator R is in parallel with the three phases and therefore remains unaffected. If an overload causes one of the relays G, H, or K to operate, the circuits of the remaining two relays are interrupted. In order that this may take place with as little sparking as possible, it is advisable to work with the core of the transformer T strongly saturated. The opening contacts of the three relays G, H, and K are connected in cyclic order.

If there is a short circuit in phase III, for example, the heaviest current is received by relay K which operates and opens contacts $k^1$ and $k^2$. The regulator R is thus connected to the secondary windings $S^3$ of phase III of transformer T through the closed contacts $h^2$ and $g^1$ and the coil K, while the circuits of coils H and G are interrupted by the opening of contacts $k^1$ and $k^2$. In the event of a short circuit in two or three phases, one of the relays will take precedence over the other two and put them out of action as before.

From the foregoing it will be seen that an improved system has been provided for protecting a polyphase line where there are at least three phases, or in other words, where the number of phases equals $(n-1)+3$ where $n$ is always positive, that in the improved system a single current-limiting regulator provides protection against overload conditions in any of the phase-lines, and that the operating winding means 20 of the regulator is excited or energized from the faulty phase-line to a degree or to an extent proportional to the magnitude of the abnormal current condition in such phase-line. The present improvements are not limited, however, to a system having at least three phases, and except where it is expressly stated otherwise in the claims, it is intended to claim the present improvements as embodied in any polyphase system.

What I claim is:

1. The combination with a polyphase system, of a regulator for governing supply to the system, detecting devices operable independently from respective phases of the system for cutting in the regulator, and connections whereby one of the detecting devices cuts out another.

2. In a polyphase system, in combination, detecting devices operable independently from respective phases of the system, a control device, means for energizing the same from any of the phases, said detecting devices controlling such energization of the control device, and means whereby any of the detecting devices cuts out the others.

3. In a polyphase system, detecting devices associated with the respective phases, transformers for energizing the detecting devices, connections whereby any detecting device may cut out the others, a current limiting regulator for controlling supply to the system, and connections whereby the detecting devices respectively control energization of the regulator.

4. In an electrical system, a polyphase line, current-limiting apparatus common to the respective phase-lines, and relay-devices associated with the respective phase-lines and being responsive to predetermined current conditions thereof and each being operable at such conditions of its associated phase-line to effect operation of said apparatus, each of said relay-devices being electrically interlocked with the others in such wise that its operation effects locking-out of the latter from operating action with respect to said apparatus.

In testimony whereof I have hereunto subscribed my name this 9 day of August, A. D. 1926, at Berne, Switzerland.

ERNST HERMANN FREY.